(12) United States Patent
Ceesay

(10) Patent No.: US 11,614,073 B1
(45) Date of Patent: Mar. 28, 2023

(54) MULTIPLE FOLDED BLADE VERTICAL AXIS WIND TURBINE

(71) Applicant: Kaab Ceesay, Bronx, NY (US)

(72) Inventor: Kaab Ceesay, Bronx, NY (US)

( * ) Notice: Subject to any disclaimer, the term of this patent is extended or adjusted under 35 U.S.C. 154(b) by 0 days.

(21) Appl. No.: 17/535,629

(22) Filed: Nov. 25, 2021

(51) Int. Cl.
   *F03D 9/25* (2016.01)
   *F03D 3/00* (2006.01)
   *H02K 7/18* (2006.01)

(52) U.S. Cl.
   CPC ............... *F03D 9/25* (2016.05); *F03D 3/005* (2013.01); *H02K 7/183* (2013.01); *F05B 2220/7068* (2013.01); *F05B 2240/211* (2013.01); *F05B 2240/30* (2013.01); *Y02E 10/74* (2013.01)

(58) Field of Classification Search
   CPC . F03D 9/25; F03D 3/005; H02K 7/183; F05B 2220/7068; F05B 2240/211; F05B 2240/30; Y02E 10/74
   See application file for complete search history.

(56) References Cited

U.S. PATENT DOCUMENTS

| | | | |
|---|---|---|---|
| 11,486,353 B2* | 11/2022 | Suzuki | F03D 3/062 |
| 2014/0100784 A1* | 4/2014 | Thomas | F03D 3/02 |
| | | | 702/5 |
| 2019/0055927 A1* | 2/2019 | Suzuki | F03D 9/25 |
| 2020/0072190 A1* | 3/2020 | Buchanan | F03D 9/25 |
| 2020/0277935 A1* | 9/2020 | Umaya | F03D 9/007 |
| 2021/0222676 A1* | 7/2021 | Karasawa | F03D 13/10 |
| 2022/0290649 A1* | 9/2022 | Hench | F03D 9/25 |

* cited by examiner

*Primary Examiner* — Michael C Zarroli

(57) ABSTRACT

A vertical axis wind turbine system for generating electricity. The whole turbine and the generator is structured around a single pole in the center. The pole holds the whole system together and supports the entire system. The System includes a turbine and a generator assembly. It consists of multiple folded L-shaped rectangle blades, which are structured around an empty cylinder whose purpose is to force air to go around it and into the blades for better efficiency. The empty cylinder is attached to the pole in the center of the system. The blades are attached to a bearing that spins around the pole on the top end and attached to the rotor on the bottom end of the empty cylinder. Each blade is folded at an angle to reduce the drag of the returning blades without compromising the surface area of the going blades.

1 Claim, 8 Drawing Sheets

MULTIPLE FOLDED BLADE VERTICAL AXIS WIND TURBINE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
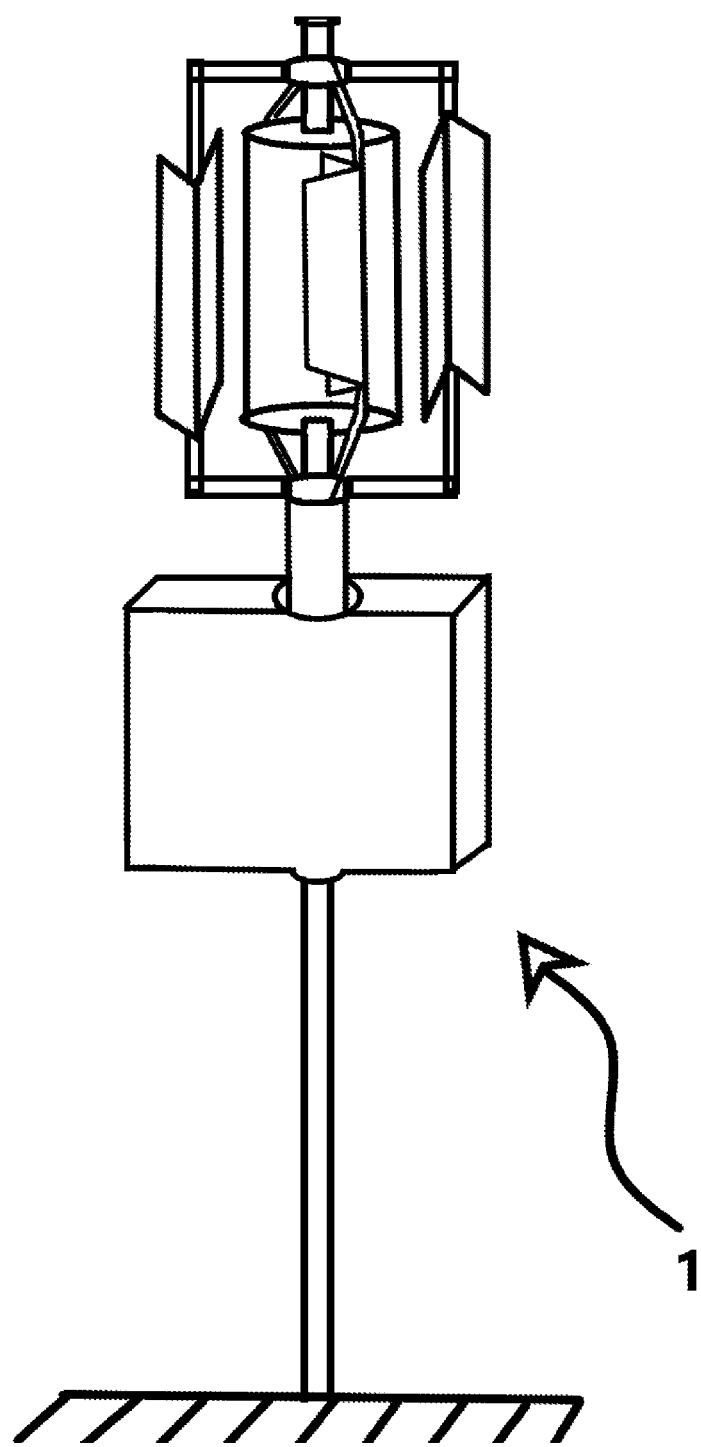

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

DESCRIPTION

Technical Field of the Invention

This innovation is related to vertical axis wind turbines, specifically the improved blade design, which is designed to reduce drag of the returning blades by decreasing the blades surface area and increase efficiency of the going blades by increasing the blades surface area. The turbine also has a stationary empty cylinder in the center which is between the blades to distribute and force the moving wind to its sides. Great percentage of this wind is used to push the going blades which are open facing the wind. However, due to the design of the blades, the returning blade can easily slice through the wind with little to no drag because it is open facing away from the wind and folded at an angle which reduces the returning blades surface area of contact.

Background of the Invention

A vertical axis wind turbine power generating system has been around for many decades now and many designs, each calming supremacy. However many engineers and researchers are still experimenting with many blade designs to increase efficiency, as global demand for wind energy has increased in recent months, as well as many investors/companies are still trying to find the right design to bait on. My design will focus on efficiency by reducing the drag of the returning blade. A returning blades are always the blades that the wind is not pushing against or the blade that is spinning counter to the wind direction or the blade that is not open facing the wind or the viewer. I will achieve this increased efficiency with a blade design which is folded at an angle rather than curve. The angular design will make it easy for the returning blades to slice through the wind when it's not been pushed by the wind as it rotates around the cylinder. The slicing reduces drag because the surface area of the blades in contact with the wind is reduced. The going blades which are always open facing the wind allow a maximum amount of wind to push against it. The empty cylinder prevents the wind from passing through it. Rather the empty cylinder forces wind to go around it, where the wind pushes the blades which are around the cylinder. The process will increase the blades rotation speed as well as require less wind to spin the blades. This design is trying to generate a usable/manageable amount of energy in areas around the world where wind is not as strong, like fixing the turbine to the rooftops of a city building, on roof house's, on electric cars etc. Basically to bring energy closer to the user which will reduce cost as well.

Existing art: A vertical axis wind turbine is coupled with many different parts. Such as the blades, Joints, bearings, rods, pins, cylinders, welded parts, coil windings, nuts, bolts and how the multiple blades connect to the bearing that rotate around the pole will use the same techniques that have been around for many hundreds of years. My design is different because of the way it puts different parts together to bring about better efficiency. My blade design however is relatively new. I am not aware of any design that uses this technique to the best of my knowledge.

Current art: List of the disadvantages of the current art:
1) In ability to operate in low wind areas
2) Expensive to build
3) Expensive to operate
4) Expensive to transport, maintain and mount at the operating site.
5) Not reliable and takes too much space
6) Blades Designs are not able to capture the maximum amount of wind and utilized
7) Blades are not designed to increase efficiency and reduce drag.

BRIEF SUMMARY OF THE INVENTION

The purpose of the turbine is to bring energy closer to the user, to eliminate the need for new and long transmission lines, to make Electric Vehicles grid free etc. This vertical axis wind turbine is designed to be efficient, compact and come in different sizes. So it can be installed in many different places and things, like rooftops, electric cars, ships, boats etc. The turbine is able to achieve this claims because of the unique design of the turbine blades, which are folded at an angle. The blades that are facing the wind are open at an angle, increasing the blades surface area, which is good because there will be more wind pushing against the blades, causing the turbine to spin faster. The blades that are facing away from the direction of the wind drag are reduced, because the blades are folded at an angle reducing the surface area of the blades allowing the blades to easily slice through the wind. The purpose of the empty cylinder that is attached to the pole is to increase efficiency, reduce noise and vibration. The pole is in the center, it support and keep the whole system together. The bottom half is the generator, which is used to generate electricity. The uniqueness of the turbine is in the top half, the folded blades and how it's structured around the empty cylinder to make an efficient wind turbine.

BRIEF DESCRIPTION OF THE SEVERAL VIEWS OF THE DRAWING(S)

Note: For simplicity of the illustration nuts, bolts, welded areas, glued and attached area's are not depicted as they are known to those who are skilled in this art. When they are shown is purely for illustration purposes, and not intended to capture all embodiments of the invention disclosed.

FIG. 1. Is a complete side view of the entire structure of the turbine system. It shows the turbine blades on the top section and the generator in the middle as a box because of the casing.

Figure 2:
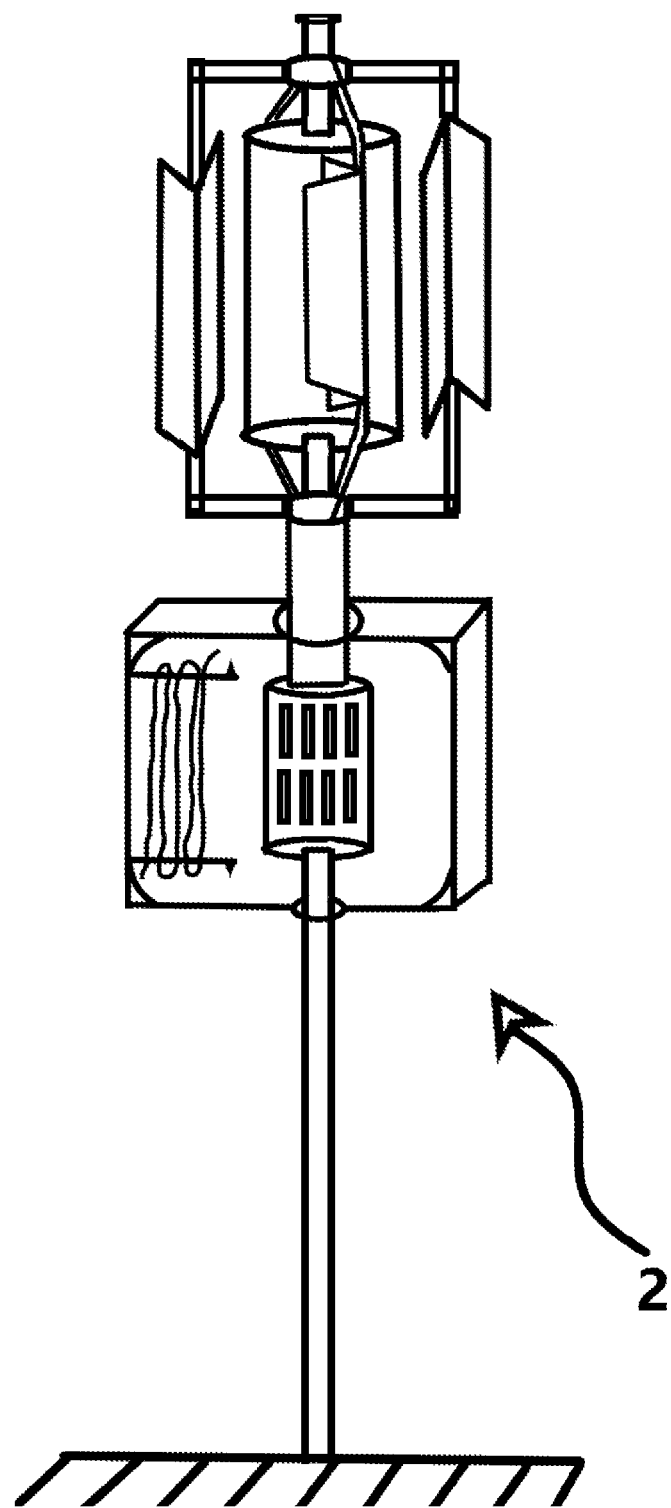

FIG. 2. Is a complete side view of the entire structure of the turbine system. It shows the turbine as the top section and the generator in the middle. As well as a partial view of the inside of the generator.

Figure 3:
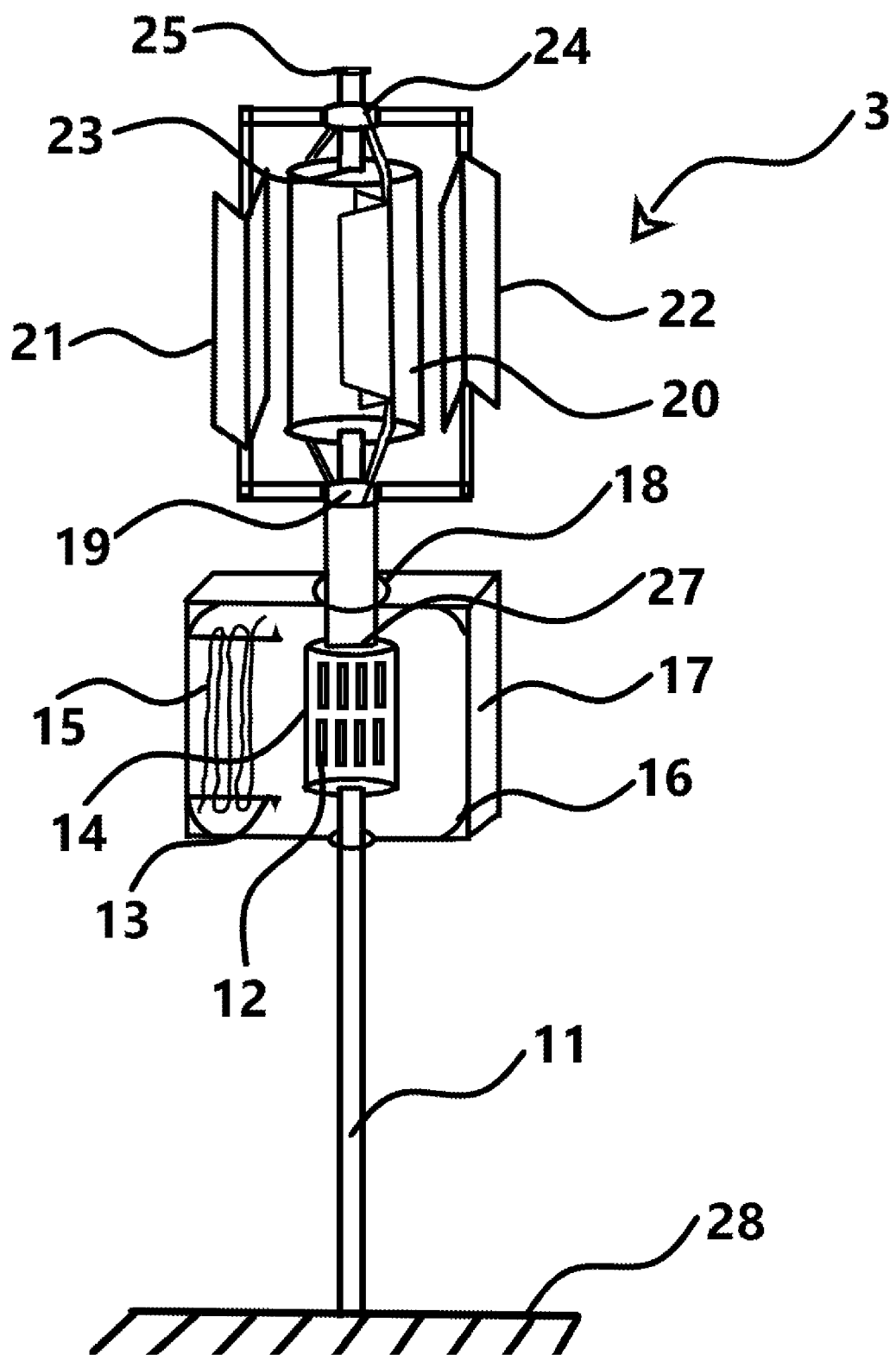

FIG. 3. complete side view of the entire structure of the turbine system. It shows the turbine as the top section and the generator in the middle. As well as a partial view of the inside of the generator. The figure also has the leader lines which will be discussed in detail in the detailed description section.

Figure 4:
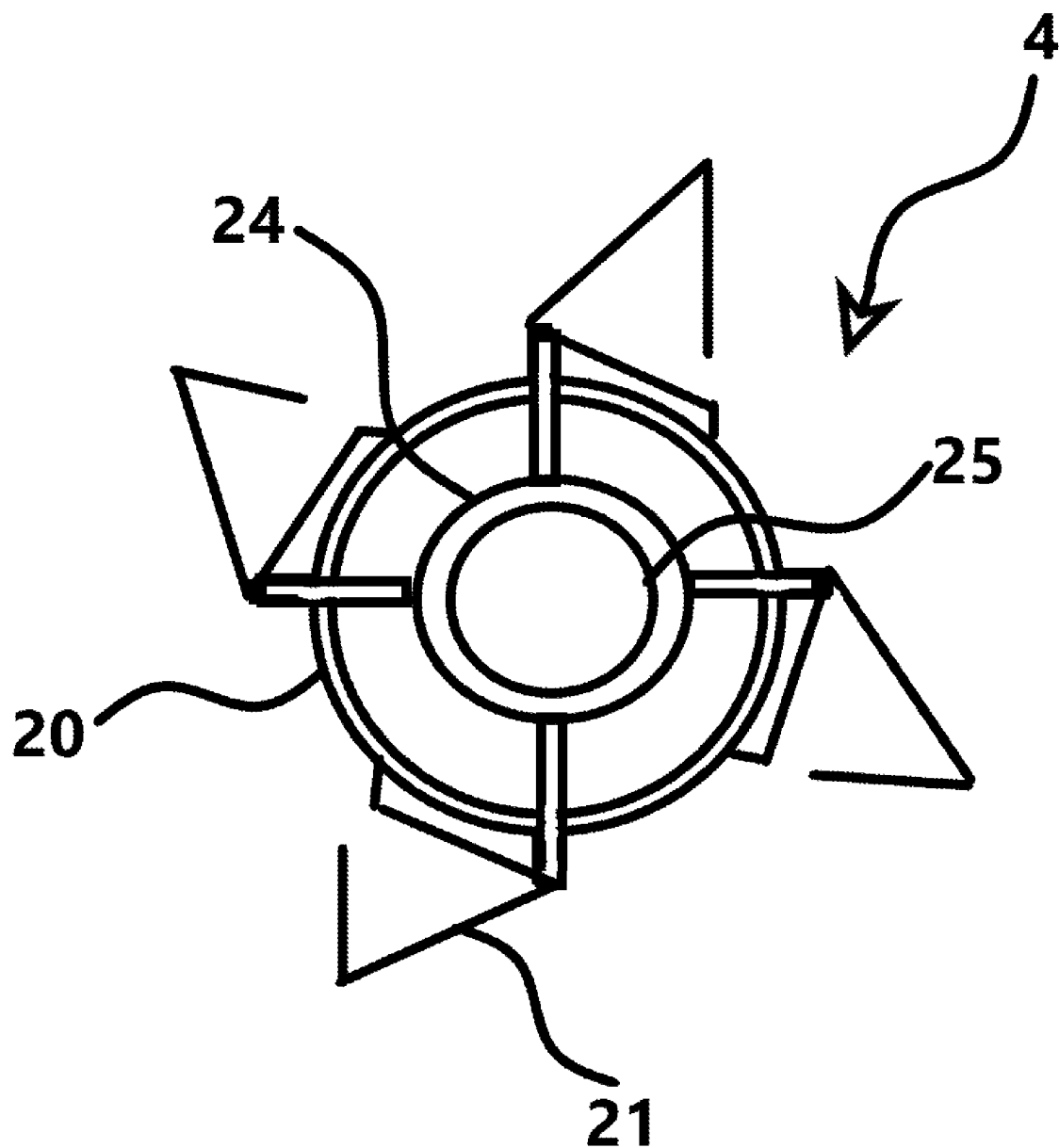

FIG. 4. The complete top view of the entire structure. The few parts that can Be seen are the cap on the top of the pole. The joint where the multiple blades connected to the bearing. The cylinder and the multiple blades.

Figure 5:
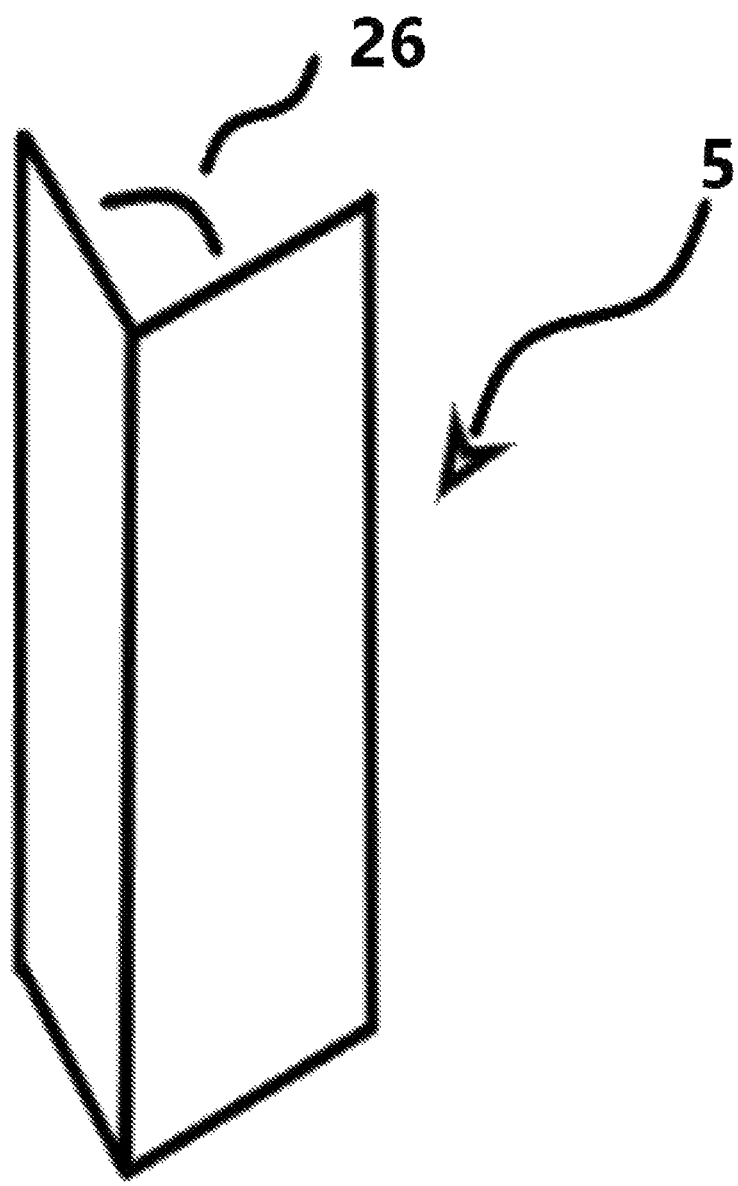

FIG. 5. The figure shows a close in view of single blades and the blade attack angle.

Figure 6:
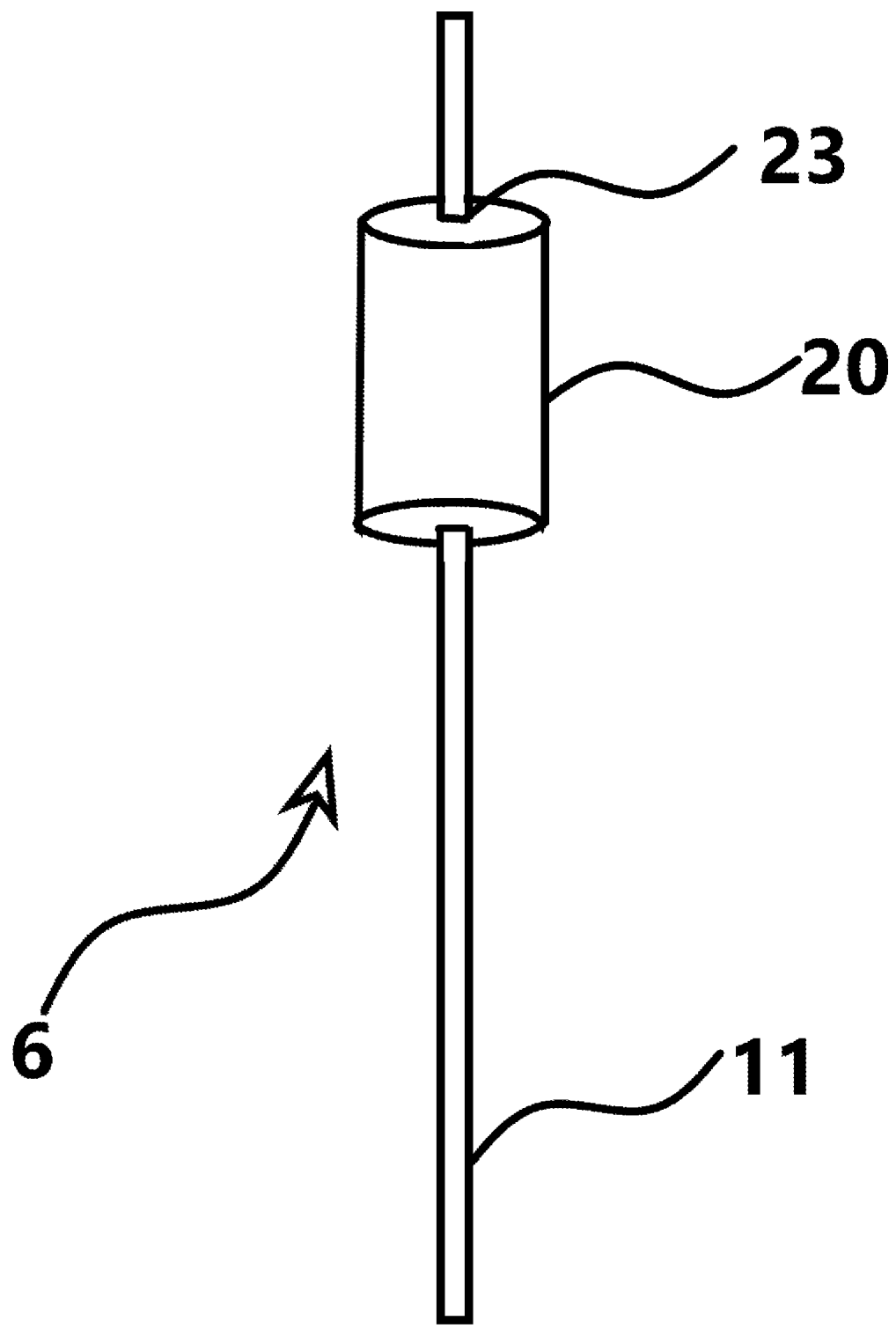

FIG. 6. This figure shows the close in view of the pole and the empty cylinder.

Figure 7:
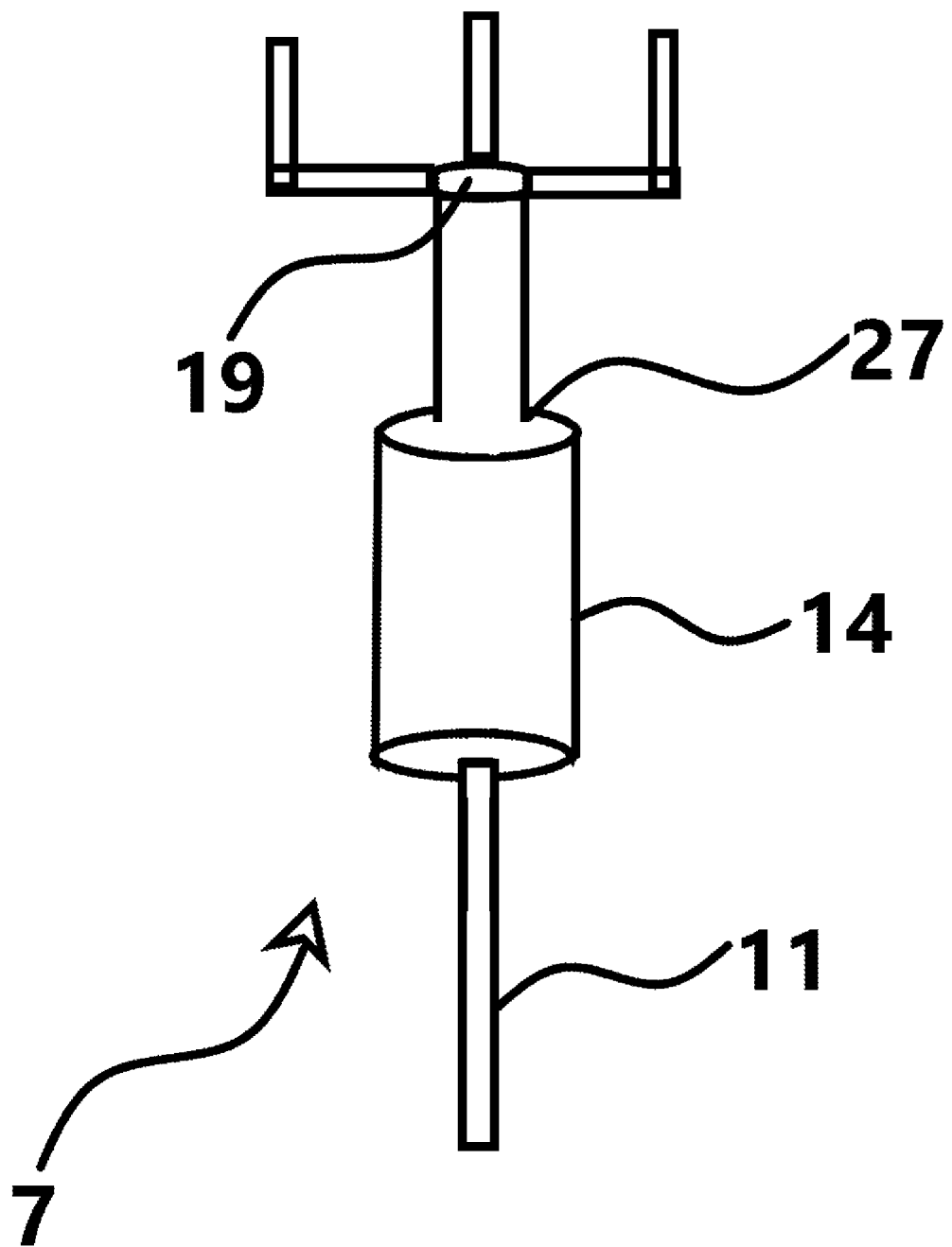

FIG. 7. This figure shows the close in view of the pole, the rotor (the rotor comes in shapes, in this case the rotor consists of two connecting cylinders, a small cylinder and a big cylinder) that is inside the generator without the magnets attached to it. The joint where the multiple blades connected to rotor and some part of the blades skinny rods.

Figure 8:
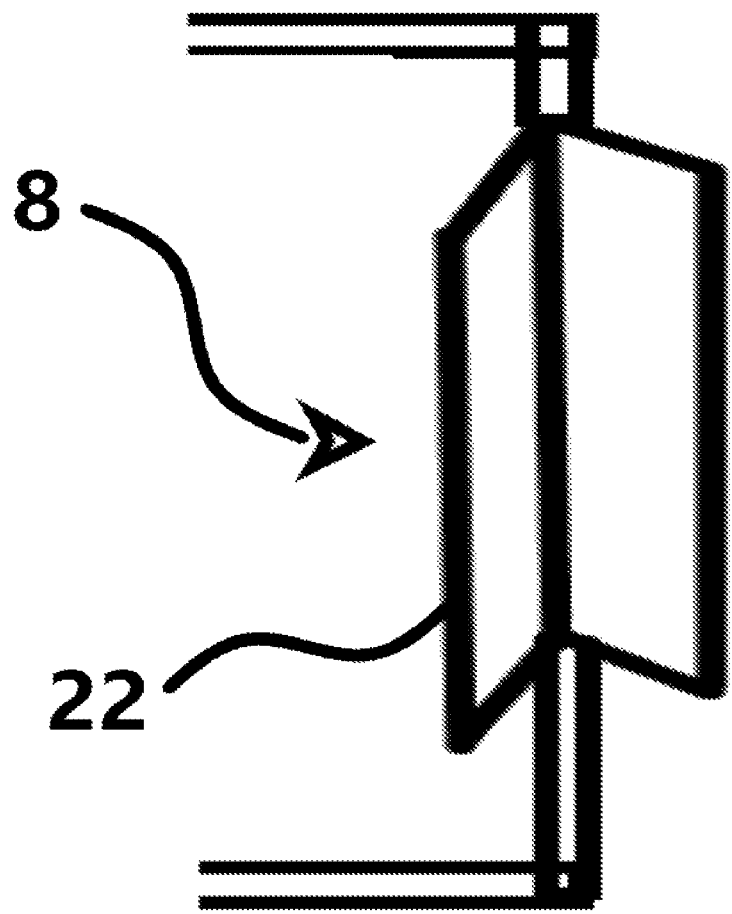

FIG. 8. This figure shows the close in view of the going blade and some parts of the blade skinny rod that extend around the top of the empty cylinder and meet at the bearing which rotate around the pole.

DETAILED DESCRIPTION OF THE INVENTION

The various embodiment variations therefore illustrated in the accompanying Figures and/or described herein merely exemplary and are not meant to limit the scope of the invention. It is to be appreciated that numerous variations of the invention have been contemplated as would be obvious to one of ordinary skills in the art with the benefits of this disclosure. Rather, the scope and breadth of afforded this document should only be limited by the claim provided herein while applying either the plain meaning of each the terms and phrases in the claim or the meaning clearly and unambiguously provided in this specification.

Terminology

The terms and phrases as indicated in parenthesis (" ") in this section are intended to have the meaning ascribed to them in this section applied to them throughout this document including the claims unless clearly indicated otherwise in context.

The term "or" as used in the specifications and the appended claims is not meant to be exclusive, rather the term is inclusive meaning "either or both".

Reference in the specification to "one embodiment", "an embodiment", "a preferred embodiment", "an alternative embodiment", "embodiments", "variations", and similar phrases mean that a particular feature, structure, and characteristic described in connection with the embodiment(s) or variation(s) is included in at least an embodiment or variation of the invention. The appearance of the phrase "in one embodiment" or "in one variation" in various places in the specification are not necessarily all referring to the same embodiment or variation.

The term "spin", "rotate around", "connected", "joined", "welded", "glued", "attached", or "fixed" as used in the specification and the appended claims referred to either an indirect or direct connection between the identified elements, components or objects. Often the manner of the coupling will be related specifically to the manner in which the two coupled elements interact.

The phrases "L-shape rectangle blade", "skinny rod", "bearings", "empty cylinder" and "rotor" and similar phrases refer to turbine and generator respectively wherein the turbine is in an upright standing position. The "upright standing position" is the most common and well known way a typical vertical axis wind turbine operates at. This type of turbine and accordingly the phrases as used herein does not deviate from that commonly held meaning. In contrast, a "going blade", "returning blade", is one in which the blades open facing the viewer or the wind is the going blade, while the blades not open facing the viewer or the wind is the returning blade.

There are hundreds of components associated with the wind turbine industry that are so commonly as to be turbine and therefore are excluded from the description herein.

Items such as blade details, generator detail, welded details, bearing details, nuts, bolts, washers and the like. Those individuals with ordinary skills in the art, with the benefit of this disclosure can, from the descriptions and diagrams provided herein easily and obviously understand and determine exactly what is required to manufacture, assembly or buy items not shown.

An Embodiment of a Unique Vertical Axis Wind Turbine with Improved Blade Design:

An embodiment of a vertical axis wind turbine is illustrated all or in part in FIGS. 1-6. Referring primarily to FIG. 3), line 11 is just the pole that run through the entire length of the turbine and hold everything together, line 12 is just the magnets of the generator which are attached to the rotor, line 13 is the L-shaped pin which the copper coils are welded against, line 14 is the rotor which the magnets are attached to, rotor is also directly connected to the turbine blades. When the turbine blades spin the rotor also spins. The rotor is connected to the pole through a bearing that allows the rotor spin around the pole, however not allowed to move up or down, line 27 is where the rotor cylinder changes shape from big cylinder to small cylinder as it's needed. The rotor cylinder changes shape so the casing can easily cover the rotor and protect it from the elements. Also to reduce weight and make it easy for the rotor to be connected to the blades, line 15 is the copper coils winding of the generator which is about half inch away from the magnets. The magnets attached to the rotor that spin inside the casing which hold the copper coils windings, the magnets literally push the atoms of the copper coils around which generate electricity, line 16 is the cut in the outer case of the generator to show partial inside view of the generator, line 17 is the outer casing of the generator, it hold the L-shaped pins which the copper coils are winding against and also serve as case to protect the generator from outside elements. Such as rain, snow, dust etc. The outer casing is stationary, line 18 is where the outer casing of the generator and the rotor meet. The outer casing is not completely attached to the rotor, as the rotor is allowed to spin within the outer casing, line 19 is where the rotor and the turbine blades connect. The rotor, the bearings and the blades are all completely connected and attached to each other in a way that if one spin the other spin too, line 20 is the empty cylinder in the middle attached to the pole. The cylinder is stationary, it cannot move up and down or slip and rotate around the pole, line 21 is the returning blade. Returning blade which is always the one that is not open facing the direction of the blowing wind or the viewer, line 22 is the going blade, the going blade is the one that is always open facing the direction of the blowing wind or the viewer, line 23 is where the empty cylinder welded to the pole. The empty cylinder is completely attached to the pole and not allow to move or spin in any direction. The cylinder only purpose is block air, distribute air and force air around the cylinder into the blades, line 24 is where the four blades connect to the bearing that rotate around the pole for better balance of the blades, line 25 is the cap at the top of the pole. The cap's only purpose is to keep the blades from flying away, however with the way the rotor is secure, and the empty cylinder in the middle makes the cap redundant. It's there purely for looks, line 28 is the base of the pole which will connect to ground or any other structure at the operating site.

Referring primarily In FIG. 4), line 20 is the top view of the cylinder that is between the blades, line 21 is the top view of the blades, line 24 is the bearing which the blades are attached to, that rotate around the pole for balancing the blades and line 25 is just the top view of the cap of the pole.

Referring primarily in FIG. 5), line 26 is pointing to the angle of the plain blade with nothing attached to the blade. It's also showing the blade attack angle which can varies. Referring primarily in FIG. 6), line 11 is just the pole that run through the entire length of the turbine and hold everything together, line 20 is just the empty cylinder which is completely attached to the pole and the cylinder is not allow to move in any direction and line 23 is where the cylinder is welded to the pole, just standard welding.

Referring primarily In FIG. 7), line 11 is just the pole that run through the entire length of the turbine and hold everything together, line 14 is the close in view of the rotor without the magnets attached to it, the rotor is connected to the pole through bearing which allows it to spin around the pole without moving up and down, line 27 is where the rotor cylinder change shape from big cylinder to small cylinder as it's needed. The rotor cylinder change shape so the casing can easily cover the rotor and protect it from the elements. Also to reduce weight and make it easy for the rotor to be connected to the blades, line 19 is closer in view of where the rotor is connected to the blades.

Referring Primarily In FIG. 8), line 22 closer in view of the going blade with the skinny rods attached to either ends that extends to be connected to the bearing that is above the empty cylinder and the rotor that is below the empty cylinder.

The invention claim is:
1. A vertical axis wind turbine design with improved blade design comprising:
   a. a tall pole with circular cap on the top and supporting base at the bottom which the pole can stand on,
   b. an empty cylinder attached to the pole on the top part just little below the cap, extending to one-third length of the pole in a way that the pole is in the center of the cylinder,
   c. a bearing is placed at the top of the empty cylinder between the cap and the empty cylinder,
   d. a bearing is also placed at the bottom of the empty cylinder,
   e. a multiple L-shaped folded rectangle blades, two or more L-shaped rectangle blade about the length of the empty cylinder placed on the side of the empty cylinder inches away from the empty cylinder, the blades are equal apart from each other, in a way that if the turbine is facing a viewer, the blade on the right is open facing the viewer, the on the left is open facing away from the viewer, the blade in the middle is facing sideways and the fourth blade cannot be seen because it is behind the empty cylinder
   f. a skinny rod is connected to the top and bottom side of the blades, the skinny rod then takes a turn around the empty cylinder and connected with the bearing on both the top and bottom part of the empty cylinder,
   g. another skinny hollow cylinder is placed around the pole, connecting to the bearing near the bottom of the empty cylinder in a way that the pole is in the center of the cylinder,
   h. another wide cylinder which is about twice the size of the the skinny hollow cylinder is welded to the bottom the skinny hollow cylinder in such a way that the pole is always in the center of each cylinder;
   i. a permanent magnets in rectangle shape are attached to the wide cylinder, therefore a rotor consists of the skinny hollow cylinder connected to the wide cylinder which in turn are connected to the permanent magnets;
   j. a casing in shape of box is placed around the wide cylinder, where the bottom is permanently welded to the pole and on the top part a little gap is left so the rotor can spin within the casing smoothly,
   k. a cuts are made on the four corners of the box to give a viewer a partial working view of a generator,
   l. a two small steel L-shaped pins are extended from the casing inwards towards the rotor on the left side of the casing one at top and one at the bottom, these small L-shaped pins are extended to stop short of touching the rotor by inches,
   m. a copper coils are wound against these two small L-shaped pins in up and down motion, therefore the rotor together with the wound copper coils around these pins constitutes the generator.

* * * * *